(12) United States Patent
Chandoor et al.

(10) Patent No.: US 11,442,796 B2
(45) Date of Patent: Sep. 13, 2022

(54) SYSTEM AND METHOD FOR CREATING OR UPDATING AN API CONFIGURATION

(71) Applicant: VISA INTERNATIONAL SERVICE ASSOCIATION, San Francisco, CA (US)

(72) Inventors: Madhuri Chandoor, Foster City, CA (US); Mohammad Al-Bedaiwi, Austin, TX (US); Nirmesh Desai, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 98 days.

(21) Appl. No.: 16/359,710

(22) Filed: Mar. 20, 2019

(65) Prior Publication Data
US 2020/0301763 A1  Sep. 24, 2020

(51) Int. Cl.
*G06F 9/54* (2006.01)
*G06F 16/93* (2019.01)
*G06F 9/451* (2018.01)
*G06F 9/445* (2018.01)

(52) U.S. Cl.
CPC .......... *G06F 9/541* (2013.01); *G06F 9/44505* (2013.01); *G06F 9/451* (2018.02); *G06F 16/93* (2019.01)

(58) Field of Classification Search
None
See application file for complete search history.

(56) References Cited

U.S. PATENT DOCUMENTS

| | | | | |
|---|---|---|---|---|
| 9,471,285 B1* | 10/2016 | Koohgoli | .................. | G06F 8/75 |
| 10,194,001 B1* | 1/2019 | Gardiner | ................. | H04L 67/28 |
| 2011/0191303 A1* | 8/2011 | Kaufman | .................. | G06F 7/00 |
| | | | | 707/684 |
| 2012/0017222 A1* | 1/2012 | May | ..................... | H04L 12/6418 |
| | | | | 719/328 |
| 2016/0173569 A1* | 6/2016 | Narasimhan | ............ | H04L 67/10 |
| | | | | 709/203 |
| 2017/0132282 A1* | 5/2017 | Martin | .............. | G06F 16/24535 |
| 2020/0036599 A1* | 1/2020 | Savov | ..................... | H04L 47/70 |

* cited by examiner

*Primary Examiner* — Chat C Do
*Assistant Examiner* — William C Wood
(74) *Attorney, Agent, or Firm* — Loeb & Loeb LLP (57) ABSTRACT

A system and method may reduce the costs associated with adding or editing configuration elements for an API. A generic schema for the API codebase may keep the configuration definitions flexible and associations between various configuration definitions may also be saved within the codebase. New configuration instances may then be created using the definition of the configuration. Since the definition of the configuration is saved in a codebase, updating the definition or adding a new definition will not require going through the cycle of requirement analysis, coding, and testing. Once the definition is updated, the application code may appropriately mark the difference between the configuration instance and its definition and it will utilize the new definition to create instances of the new configuration.

14 Claims, 6 Drawing Sheets

| Digital Product Configuration | | | | |
|---|---|---|---|---|
| Attributes Configuration | | | | |
| Attribute 1 Display Name | | Input Type: Dropdown | | |
| ○ Single Field | ○ Multiple Field | ○ Predefined Field | | |
| Attribute 2 Display Name | Text Field ⌄ | Visibility ⌄ | Validation ⌄ | |
| Internal Field Name | Specific ⌄ | Profile Type ⌄ | Uniqueness ⌄ | |

330 (top of dialog)

○ Add Another
— 332

334 — CANCEL  SAVE

SYSTEM AND METHOD FOR CREATING OR UPDATING AN API CONFIGURATION

BACKGROUND

Over their lifetime, web-based applications typically require changes to their configuration to suit the evolving needs of the business that uses the application and various other technical requirements. Tight coupling between the application code and the set of configurations supported and the list of supported attributes or details for each configuration (i.e., definition of the configuration) can complicate the change process. For example, changes to applications that include this tight coupling require code changes so that the requested change can be persisted in the codebase. Code changes also require completing a cycle of requirement analysis, coding, and testing that incurs significant time and financial cost. Most work in requirement analysis in Representational State Transfer (REST) systems and RESTful Web services (RWS) revolves around getting new attributes, understanding their valid values, having a business owner approve the attribute name and validation rules. Implementation for the attributes follows same pattern, as well as the test case execution, except that data for the test cases has now been updated.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The disclosure presents practical applications to software design and API maintenance by reducing the coupling between the application code and the set of configurations, expose the REST API, and reduce the costs associated with these changes. A generic schema for the codebase may keep the configuration definitions flexible and associations between various configuration definitions may also be saved within the codebase. New configuration instances may then be created using the definition of the configuration. Since the definition of the configuration is saved in a codebase, updating the definition or adding a new definition will not require going through the cycle of requirement analysis, coding, and testing. Once the definition is updated, the application code appropriately marks the difference between the configuration instance and its definition and it will utilize the new definition to create instances of the new configuration.

In some embodiments, a processor-implemented method may receive a configuration element from a client for a software application via an onboarding graphical user interface. The configuration element may define an operation of the software application for the client. The configuration element may be selected from a plurality of configuration elements that are displayed in the onboarding graphical user interface. The method may also store the configuration element in a non-normalized codebase and determine a URI for the configuration element. The method may then update a codebase for the software application with the URI and resolve the URI to the configuration element upon execution of computer code for the software application that includes the URI. Upon execution, the software application may implement an operation of the software application for the client including the configuration element.

In further embodiments, a system may edit an API configuration definition without tightly coupling computer code for the API and the API configuration definition. The system may include a processor and memory hosting an application maintenance system as well as a codebase coupled to the processor and the memory. The codebase may store an application programming interface (API) specification including one or more configuration definitions. The memory may include instructions that are executable by the processor. For example, upon execution by the processor, an instruction may receive a configuration element from a client for a software application via an onboarding graphical user interface. The configuration element may define an operation of the software application for the client. Instructions may also store the configuration element in the codebase and determine a URI for the configuration element. Further instructions may update the codebase for the software application with the URI, and, upon execution of computer code for the software application that includes the URI, resolve the URI to the configuration element Execution may also cause the software application to implement the operation of the software application for the client including the configuration element.

BRIEF DESCRIPTION OF THE FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

DETAILED DESCRIPTION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
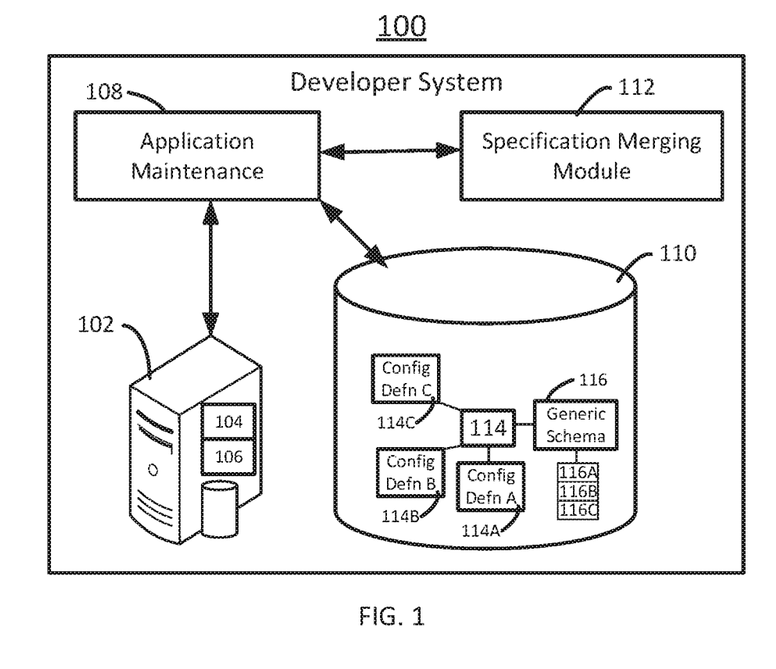
FIG. 1 shows an illustration of an exemplary application maintenance system for managing configuration definition changes to software applications.

FIG. 1 generally illustrates one embodiment of an application maintenance system 100 for managing configuration definition changes to software applications and expose REST API without changing the application code. In some embodiments, the system 100 includes a developer computer system 102 having a processor 104 for executing processor-executable instructions of various modules that are stored in processor-readable memories of the system 100, such as memory 106. One module may include an application maintenance tool 108. The application maintenance tool 108 may include an integrated development environment (IDE), software framework, or other set of processor-executable instructions for execution on the developer computer system 102 that provide features to computer programmers for software development. Some features of the tool 108 may include a source code editor, build automation tools, a debugger, and a compiler or interpreter (or both). The tool 108 may also include modules that provide generic functionality that a developer can selectively change by additional developer-written code to build application-specific software to meet particular client needs. The tool 108 may be communicatively coupled to a code repository 110 (i.e., a code base). The code repository 110 may include various code segments or APIs (e.g., API 114) that each include computer code implementing or defining a set of subroutine definitions, communication protocols, and tools for building and maintaining software using the tool 108 such as an application programming interface (API).

The API 114 may include one or more configuration definitions 114A, 114B, 114C and a generic schema 116 for the API 114 that includes one or more URIs 116A, 116B, 116C, etc., for configuration elements within the codebase 110. In some embodiments, each configuration definition 114A, 114B, 114C includes a defined set of interactions corresponding to the API 114 that uses a known protocol and data format (e.g., the REST API and HTTP protocol using JSON or XML as the data format that is exchanged). For example, a data request might use an HTTP GET method, and a data record might use an HTTP POST method. The data format may be determined by the type of application that calls the API. JSON is commonly used for web pages or mobile applications that present a user interface (by using JavaScript or HTML), whereas XML may be used for machine-to-machine APIs. The defined set of interactions for each configuration definition (114A, 114B, 114C) may determine how the corresponding API 114 behaves within its execution environment. The generic schema 116 describes how the data for the respective API 114 is structured and includes URIs 116A, 116B, 116C, etc., that include information to name a resource for the API 114, or a resource name with a method of reaching it within the codebase 110.

For example, in some embodiments, a first configuration definition 114A for the API 114 may include a Merchant with many attributes such as a business identifier, a contact email, a contact phone, an address, etc. Uniform resource identifiers (URIs), which are static, may be created to add instances of the various definitions. URIs for a Merchant definition 114A, for example, are static and may include:

TABLE 1

| MERCHANT | |
| --- | --- |
| URI | Action |
| POST/merchants | to create Merchant |
| GET/merchants/{id} | to read an existing Merchant instance |
| PUT/merchants/{id} | to update an existing Merchant instance with an updated attribute value in the request body |
| DELETE/merchants/{id} | to delete an existing Merchant instance |

A User definition 114B may include different attributes such as First Name, Last Name, Email, Contact Phone, Address, Credit Cards, etc. URIs for a User definition 114B, for example, are static and may include:

TABLE 2

| USER | |
| --- | --- |
| URI | Action |
| POST/users | to create User |
| GET/users/{id} | to read an existing User instance |
| PUT/users/{id} | to update an existing User instance with an updated attribute value in the request body |
| DELETE/users/{id} | to delete an existing User instance |

The number and content of configuration definitions may vary as user needs for the application change. Each configuration definition 114A, 114B, 114C may also have a version indicator. When the API code and configuration definitions are tightly coupled, typical changes may require repeating some or all of the Software Delivery Life Cycle (SDLC). Using the above examples of configuration definitions, this problem frequently occurs in tightly coupled APIs when:

A component managing the definition Merchant may have shipped, but the business owner using the API needs to add a new attribute called "Allow access to UI Portal." Since the code is static and tightly coupled with the schema, the process will involve a developer checking out the code, modifying it, updating tests cases and delivering the build to test engineering team. The entire delivery cycle is repeated if the attributes are not grouped.

Business owner may need to have another concept "Account" added to the API and have instances of Account be managed via a REST end point (e.g., /merchant/{id}/accounts). Since the code is static and is not capable of understanding the concept of Account, the end points to create/read/update/delete an "Account" will result in an error.

To alleviate issues in changing the configuration definitions for a tightly-coupled system, each of the configuration definitions 114A, 114B, and 114C may be non-normalized. That is, rather than demanding only one copy of the same data, multiple copies may exist. Within each definition 114A, 114B, 114C, data storage may include separate tables for each data type or may include a single table for all data within a codebase 110 managed as a relational database management system configuration (an RDBMS configuration) or may also be managed by data type in a non-relational (i.e., non-tabular) codebase 110 (e.g., NoSQL configuration). For example, Boolean, String, varchar, etc., data may each have a separate table or grouping or be stored in a single table.

Additionally, each of the configuration definitions for an API may be defined as a URL that is available to any other API. Thus, data retrieval is possible when the system 100 receives a request at a URL for an API. As data is received at a URL, the application server may enable new URLs for that data. Rather than updating the entire stack whenever the system 100 receives new data, developers may only need to update a configuration definition (e.g., 114A, 114B, 114C) to include new data.

Figure 2:
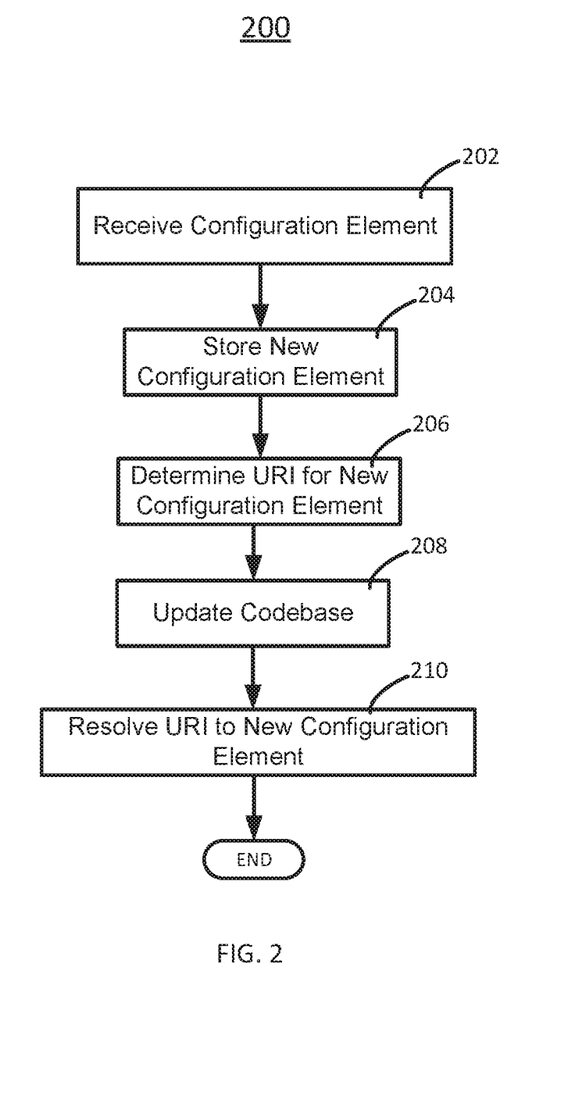
FIG. 2 shows a flowchart of a method for onboarding new users and making configuration changes for an API in an application maintenance system and for managing configuration definition changes to APIs.

With reference to FIG. 2, a computer-implemented method for onboarding new users and making configuration changes for an API (e.g., API 114) in an application maintenance system 100 and for managing configuration definition changes to APIs. Each step of the method 200 is one or more computer-executable instructions performed on a processor (e.g., 104) of a server or other computing device (e.g., developer computer system or application server 102 or other computer system) which may be physically configured to execute the different aspects of the method. Each step may include execution of any of the instructions as described in relation to the system 100 as part of the application maintenance tool 108 or other component that is internal or external to the system 100. While the below blocks are presented as an ordered set, the various steps described may be executed in any particular order to complete the real-time optimal pricing methods described herein.

Figure 3A:
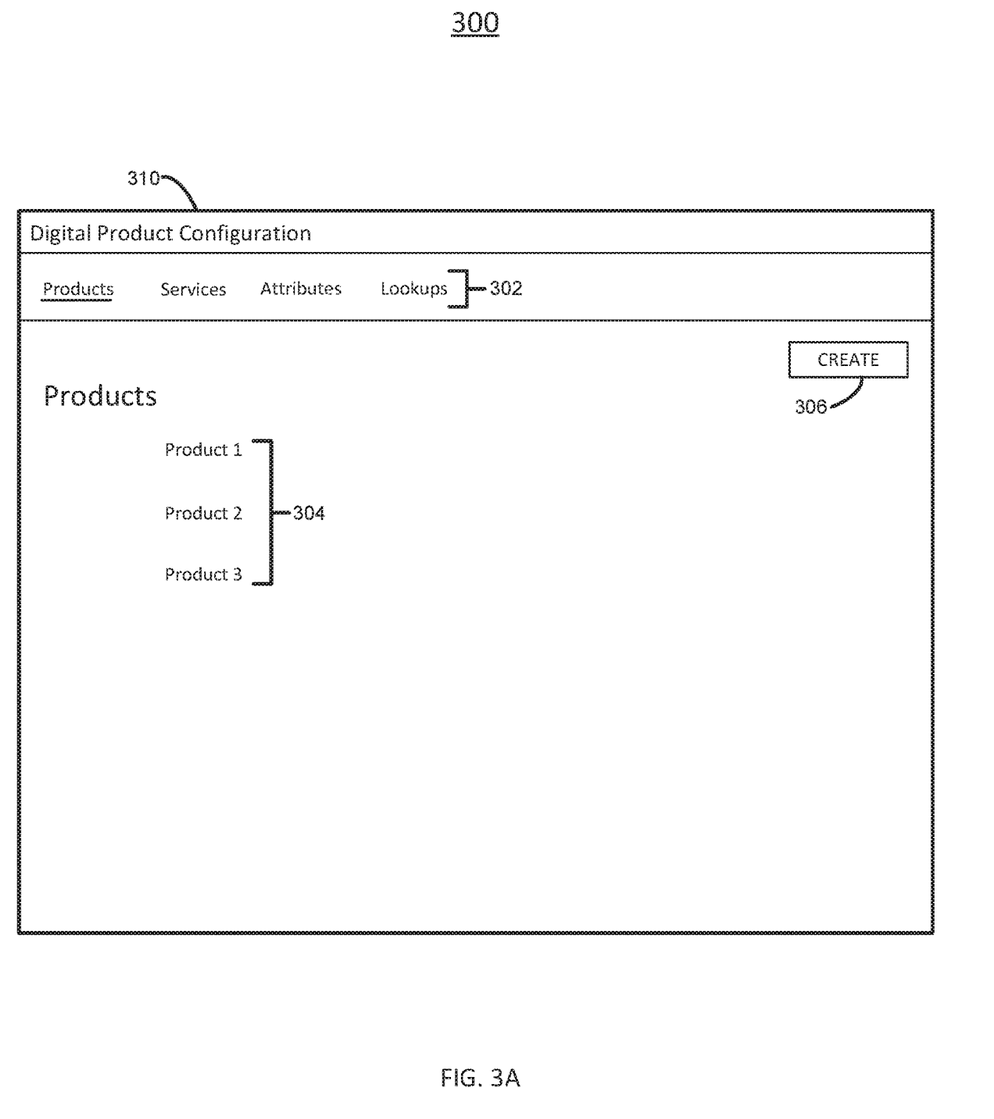
FIG. 3A shows an exemplary first user interface for updating or adding a configuration element to an API.

At block 202, the method 200 may cause a processor to execute instructions stored in a computer memory to receive a configuration element from a client for a software application (e.g., the API 114). With reference to FIG. 3A, the configuration element may be received via an onboarding graphical user interface (GUI) 300. In some embodiments, the configuration element may define an operation of the API for the client. The configuration element may also be selected from a plurality of configuration elements that are displayed in the onboarding GUI 300. A first interface 310 of the onboarding GUI 300 may include various categories 302 for configuration including products, services, attributes, and lookups. Upon selection of a category 302 within the GUI 300, block 302 may also cause the processor to execute instructions to display available selections 304 for the categories 302 (e.g., available products for editing or creating, etc.). Upon selection, a graphical object 306 such as a button or other element may also cause the method 200 to execute further instructions to launch a second interface (320, FIG. 3B) and begin the process of creating a category 302.

Figure 3B:
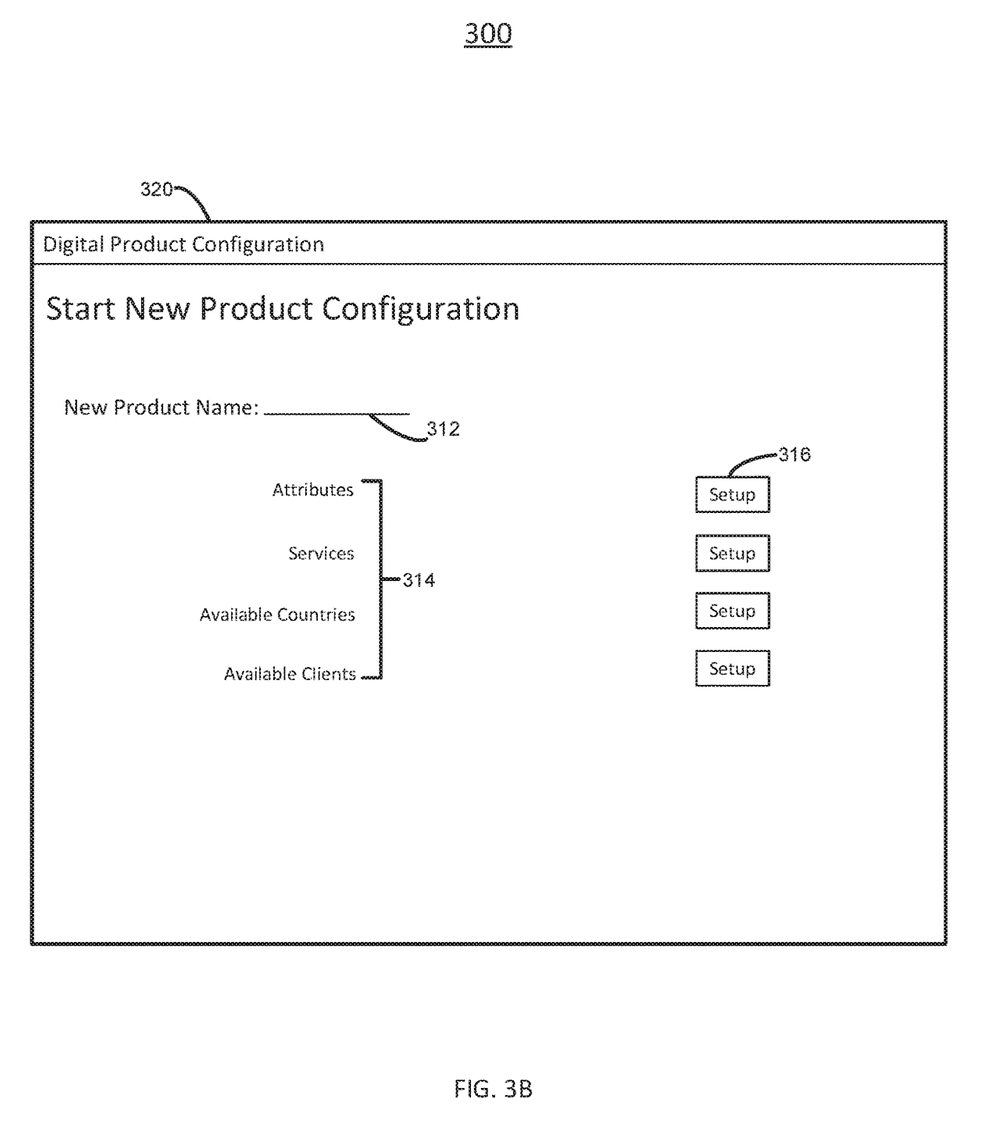
FIG. 3B shows an exemplary second user interface for updating or adding a configuration element to an API.

With reference to FIG. 3B, the second interface 320 may include a text field 312 to receive a name for a new product 312 and to receive various configuration elements 314 such as an attribute, services, available countries, and available clients. In some embodiments, upon selection of a button 316, the method 200 may execute instructions stored in a computer memory to launch a third interface 330 (FIG. 3C) to receive a configuration element 314 such as a new product name 312, an attribute, add a service, edit available countries for the API, and edit available clients for the API 114.

Figure 3C:
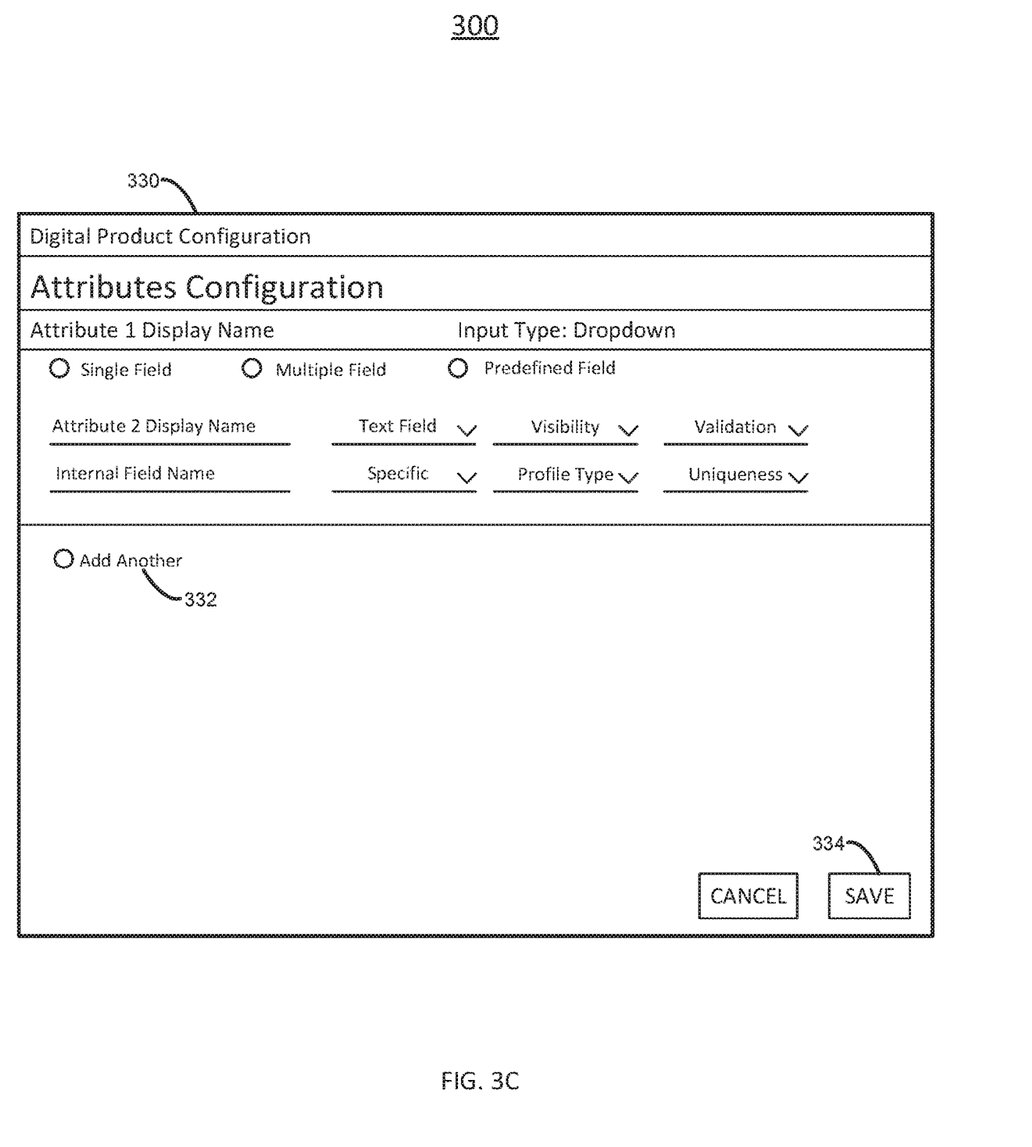
FIG. 3C shows an exemplary third user interface for updating or adding a configuration element to an API.

With reference to FIG. 3C, the third interface 330 may include options to edit a configuration element 314 that was selected from the second interface 320. For example, if an attribute was selected with the type as a dropdown, then the third interface may allow defining the attribute as a single, multiple, or predetermined field for the drop down. Similarly, if an attribute was selected with the type as a text field, then visibility and validation for the text field may also be defined in the third interface. The method 200 may also execute further instructions stored in a computer memory to launch further interfaces to define further configuration elements 314 upon selection of a button 332 or other element within the third interface 330.

At block 204, the method 200 may execute instructions stored in a computer memory to store the new configuration element 314 as configured at block 202 within a non-normalized or partially non-normalized database such as the codebase 110. Normalized databases involve multiple tables; like data is organized into one table and other related data is put into a different table. Each piece of data may be accessed through relationships to each table that are typically defined as "join" actions. Normalization reduces data redundancy and maintains data integrity. However, normalized databases can cause queries to slow down, especially in systems including a high-volume of data. Non-normalized databases organize all data into the same table to eliminate the need for multiple "join" actions to reach a particular piece of data, thus reducing complexity. In some embodiments, block 204 may execute instructions to organize the codebase 110 by type, as described above. For example, block 204 may include instructions to store attributes for the new configuration 314 within tables by data type, i.e., a RDBMS codebase, or be completely non-normalized in a NoSQL-based codebase. Further, the codebase may be a partially normalized codebase including a minimum number of tables to correspondingly reduce the number of "join" actions to reach codebase data.

At block 206, the method 200 may execute instructions stored in a computer memory to determine a URI (e.g., 116A, 116B, 116C) for the new configuration element(s) 314. The URI may include information to name a resource (i.e., an attribute, service, etc.) for the API 114, or a resource name with a method of reaching it within the codebase 110.

At block 208, the method 200 may execute instructions stored in a computer memory to update the codebase 110 with the URI 116A, 116B, 116C, etc. In some embodiments, the block 208 may include instructions to add a URI 116A, 116B, 116C, etc., to the generic schema 116 for the API 114. In other embodiments, the URI may be added to the codebase 110 without updating the schema 116 or added to code for the API in order to implement the new configuration element 314 within the API 114.

At block 210, the method 200 may execute instructions stored in a computer memory to resolve the URI 116A, 116B, 116C to the new configuration element 314 upon execution of computer code for the API 114 that includes the URI. In some embodiments, the URI may point to the new configuration element 314 such that the code for implementation of the API 114 does not need to be modified in order to implement the new configuration element 314 within the API.

Thus, the system 100 and method 210 provides a technical solution to the technical problem of efficiently updating API code by reducing the coupling between the API 114 and the set of configuration definitions 114A, 114B, 114C. In this manner, the system and method described herein may expose the REST API and reduce the costs associated with adding or editing configuration elements 314 for the API 114. A generic schema for the codebase may keep the configuration definitions flexible and associations between various configuration definitions may also be saved within the codebase. New configuration instances may then be created using the definition of the configuration. Since the definition of the configuration is saved in a codebase, updating the definition or adding a new definition will not require going through the cycle of requirement analysis, coding, and testing. Once the definition is updated, the application code appropriately marks the difference between the configuration instance and its definition and it will utilize the new definition to create instances of the new configuration.

Figure 4:
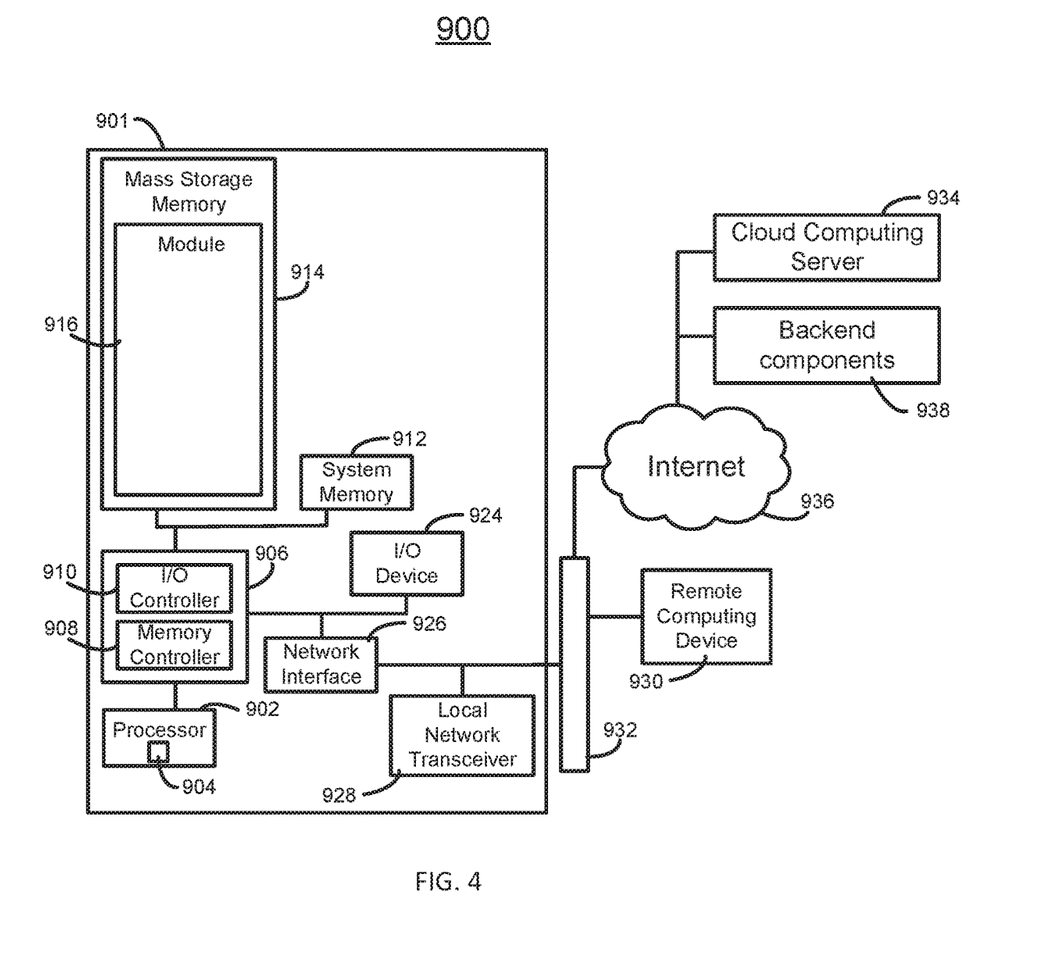
FIG. 4 shows an exemplary computing device that may be physically configured to execute the methods and include the various components described herein.

FIG. 4 is a high-level block diagram of an example computing environment 900 for the system 100 and methods (e.g., method 200) as described herein. The computing device 900 may include a server, a mobile computing device, a cellular phone, a tablet computer, a Wi-Fi-enabled device or other personal computing device capable of wireless or wired communication, a thin client, or other known type of computing device (e.g., the developer computer system 102). Logically, the computing device 900 may be designed and built to specifically execute certain tasks.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 900 is described below as including a plurality of peripherals, interfaces, chips, memories, etc., one or more of those elements may be omitted from other example processor systems used to implement and execute the example systems and methods. Also, other components may be added.

As shown in FIG. 4, the computing device 901 includes a processor 902 that is coupled to an interconnection bus. The processor 902 includes a register set or register space 904, which is depicted in FIG. 4 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 4, the computing device 901 may be a multi-processor device and, thus, may include one or more additional processors that are identical or similar to the processor 902 and that are communicatively coupled to the interconnection bus.

The processor 902 of FIG. 4 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 4 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 4 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A processor-implemented method for editing an API configuration definition for an API without tightly coupling computer code for the API and the API configuration definition comprising:

defining a generic schema for the API including a plurality of API resources, wherein each of the plurality of API resources includes a URI having a name for the API resource and a method of reaching the API resource within a non-normalized codebase;

receiving a first configuration element from a client for a software application via an onboarding graphical user interface, wherein the software application corresponds to the API, and the first configuration element defines a new operation of the software application for the client;

storing the first configuration element in the non-normalized codebase;

determining a first new URI for the first configuration element;

receiving a second configuration element for the software application, the second configuration element defining a second new operation of the software application for the client;

storing the second configuration element in the non-normalized codebase;

determining a second new URI for the second configuration element;

updating the non-normalized codebase and the generic schema for the API with the first new URI and the second new URI, wherein the first new URI includes first information to name the first configuration element for the API and a first method of for reaching the first configuration element within the non-normalized codebase and the second new URI includes second information to name the second configuration element for the API and a second method for reaching the second configuration element within the non-normalized codebase;

marking a difference between the first and second new operations of the software application and the first and second configuration elements, respectively;

resolving the first new URI to the first configuration element and the second new URI to the second configuration element upon execution of computer code for the software application from the non-normalized codebase based on the difference between the first and second new operations of the software application and the first and second configuration elements; and implementing the first and second new operations of the API for the client from the non-normalized codebase without updating the generic schema, the software application including the first and second configuration elements.

2. The method of claim 1, further comprising selecting the first and second configuration elements from a plurality of configuration elements.

3. The method of claim 2, further comprising displaying the plurality of configuration elements within the onboarding graphical user interface.

4. The method of claim 3, wherein the plurality of configuration elements includes one or more of a product, a service, an attribute, a lookup, an available country, and an available client.

5. The method of claim 1, wherein the non-normalized codebase includes a NoSQL configuration.

6. The method of claim 1, wherein updating the codebase for the software application with the first and second new URIs includes adding the new first and second new URIs to the generic schema for the API.

7. The method of claim 6, wherein updating the codebase for the software application with the first and second new URIs further includes adding the first and second configuration elements to the API without modifying computer code for implementation of the API.

8. A system for editing an API configuration definition for an API without tightly coupling computer code for the API and the API configuration definition comprising:
- a processor and memory hosting an application maintenance system; and
- a non-normalized codebase coupled to the processor and the memory, the non-normalized codebase storing an application programming interface (API) specification having a generic schema and including one or more configuration definitions;
- wherein the memory includes instructions that are executable by the processor for:
- defining the generic schema for the API including a plurality of API resources, wherein each of the plurality of API resources includes a URI having a name for the API resource and a method of reaching the API resource within the non-normalized codebase;
- receiving a first configuration element from a client for a software application via an onboarding graphical user interface, wherein the software application corresponds to the API, and the first configuration element defines a new operation of the software application for the client;
- storing the first configuration element in the non-normalized codebase;
- determining a first new URI for the first configuration element;
- receiving a second configuration element for the software application, the second configuration element defining a second new operation of the software application for the client;
- storing the second configuration element in the non-normalized codebase;
- determining a second new URI for the second configuration element;
- updating the non-normalized codebase and the generic schema for the API with the first new URI and the second new URI, wherein the first new URI includes first information to name the first configuration element for the API and a first method of for reaching the first configuration element within the non-normalized codebase and the second new URI includes second information to name the second configuration element for the API and a second method for reaching the second configuration element within the non-normalized codebase;
- marking a difference between the first and second new operations of the software application and the first and second configuration elements, respectively; and
- resolving the first new URI to the first configuration element and the second new URI to the second configuration element upon execution of computer code for the software application from the non-normalized codebase based on the difference between first and second the new operations of the software application and the first and second configuration elements; and
- implementing the first and second new operations of the API for the client from the non-normalized codebase without updating the generic schema, the software application including the first and second configuration elements.

9. The system of claim 8, further comprising instructions for selecting the first and second configuration elements from a plurality of configuration elements.

10. The system of claim 9, further comprising instructions for displaying the plurality of configuration elements within the onboarding graphical user interface.

11. The system of claim 10, wherein the plurality of configuration elements includes one or more of a product, a service, an attribute, a lookup, an available country, and an available client.

12. The system of claim 8, wherein the non-normalized codebase includes a NoSQL configuration.

13. The system of claim 8, wherein the instructions for updating the codebase for the software application with the first and second new URIs includes instructions for adding the new first and second new URIs to the generic schema for the API.

14. The system of claim 13, wherein the instructions for updating the codebase for the software application with the first and second new URIs further includes instructions for adding the first and second configuration elements to the API without modifying computer code for implementation of the API.

* * * * *